US012088697B1

(12) United States Patent
Angara et al.

(10) Patent No.: US 12,088,697 B1
(45) Date of Patent: Sep. 10, 2024

(54) SYSTEMS AND METHODS FOR PROTECTING THE SECURITY OF AUTHENTICATION CREDENTIALS UTILIZED TO ACCESS SENSITIVE DATA DURING ONLINE TRANSACTIONS

(71) Applicant: GEN DIGITAL INC., Tempe, AZ (US)

(72) Inventors: SriHarsha Angara, Fremont, CA (US); Lisa Kurahashi, Rancho Palos Verdes, CA (US); Mahesh Kamsala, Cypress, CA (US); Richard Amancio, Brockton, MA (US)

(73) Assignee: GEN DIGITAL INC., Tempe, AZ (US)

( * ) Notice: Subject to any disclaimer, the term of this patent is extended or adjusted under 35 U.S.C. 154(b) by 258 days.

(21) Appl. No.: 17/809,602

(22) Filed: Jun. 29, 2022

(51) Int. Cl.
*H04L 9/08* (2006.01)
*H04L 9/32* (2006.01)

(52) U.S. Cl.
CPC .......... *H04L 9/0825* (2013.01); *H04L 9/0866* (2013.01); *H04L 9/3213* (2013.01); *H04L 9/3228* (2013.01); *H04L 2209/56* (2013.01)

(58) Field of Classification Search
CPC ... H04L 9/0825; H04L 9/0866; H04L 9/3213; H04L 9/3228; H04L 2209/56
See application file for complete search history.

(56) References Cited

U.S. PATENT DOCUMENTS

| | | | | |
|---|---|---|---|---|
| 10,880,347 | B1 * | 12/2020 | Krishnan | ............... H04L 65/60 |
| 2015/0318993 | A1 * | 11/2015 | Hamlin | ............... H04L 63/062 |
| | | | | 713/169 |

OTHER PUBLICATIONS

OpenID, "OpenID Connect", URL: https://openid.net/connect, Feb. 26, 2014, 4 pages.
Keeper, "Secure Password Sharing_Keeper Security", URL: https://www.keepersecurity.com/features/password-sharing.html, Jan. 1, 2022, 5 pages.
Donotpay, "Save Time and Money with DoNotPay!", URL: https://donotpay.com/downloadSplit, Jan. 1, 2022, 1 page.
Kero Developer, "Give your customers a simpler and more seamless login experience", URL: https://devblog.xero.com/give-your-customers-a-simpler-and-more-seamless-login-experience-eb82a23be40e, Jul. 21, 2020, 3 pages.

\* cited by examiner

*Primary Examiner* — Brian F Shaw
(74) *Attorney, Agent, or Firm* — Greenberg Traurig, LLP

(57) ABSTRACT

The disclosed computer-implemented method for protecting the security of authentication credentials utilized to access sensitive data during online transactions may include (i) registering, utilizing a set of cryptographic keys, a proxy service with a third-party service provider of sensitive online transactions, (ii) identifying user credentials for accessing the third-party service provider, (iii) encrypting the user credentials utilizing the set of cryptographic keys, (iv) sending the encrypted user credentials in a request for authentication tokens, (v) accessing, responsive to the request, the authentication tokens for sharing with an access manager of the user credentials, and (vi) performing a security action that protects against a data privacy invasion by utilizing the authentication tokens to validate a user requesting access to a website hosted by the third-party service provider without the user credentials. Various other methods, systems, and computer-readable media are also disclosed.

20 Claims, 7 Drawing Sheets

SYSTEMS AND METHODS FOR PROTECTING THE SECURITY OF AUTHENTICATION CREDENTIALS UTILIZED TO ACCESS SENSITIVE DATA DURING ONLINE TRANSACTIONS

BACKGROUND

Secure computing networks utilized by sensitive data service providers, such as financial institutions, may often utilize a multi-authentication process for enabling security measures with respect to customer access and performing sensitive data transactions. For example, an online banking institution may utilize an intermediate security platform in a login path between a customer and the bank's website to make it appear that the customer is coming from an unknown computing device and/or IP address.

Traditional multi-authentication processes, however, suffer from a number of drawbacks that may pose both security and privacy threats to customer credentials (i.e., username/password) utilized for accessing sensitive data. For example, should the intermediate security platform in the login path between a customer and a sensitive data service provider become compromised (e.g., via hacking by a malicious actor or a programming code error), the customer's credentials may be exposed and utilized to gain access to their financial accounts.

SUMMARY

As will be described in greater detail below, the present disclosure describes various systems and methods for protecting the security of authentication credentials utilized to access sensitive data during online transactions.

In one example, a method for protecting the security of authentication credentials utilized to access sensitive data during online transactions may include (i) registering, by one or more computing devices and utilizing a set of cryptographic keys, a proxy service with a third-party service provider of sensitive online transactions, (ii) identifying, by the one or more computing devices, user credentials for accessing the third-party service provider, (iii) encrypting, by the one or more computing devices, the user credentials utilizing the set of cryptographic keys, (iv) sending, by the one or more computing devices, the encrypted user credentials in a request for authentication tokens, (v) accessing, by the one or more computing devices and responsive to the request, the authentication tokens for sharing with an access manager of the user credentials, and (vi) performing, by the one or more computing devices, a security action that protects against a data privacy invasion by utilizing the authentication tokens to validate a user requesting access to a website hosted by the third-party service provider without the user credentials.

In some examples, the authentication tokens (e.g., "hot tokens) may be on-demand limited lifespan tokens (e.g., OpenID, etc.) having a short time-to-live (TTL) when utilized within a predetermined amount of time (e.g., within the first few minutes after creation). In some examples, the access manager may be a password manager that provides a vault for storing customer credentials (i.e., usernames/passwords) and further may be utilized to encrypts/decrypt passwords on a client computing device. In some examples, the proxy service may be a web isolation platform for rendering a version of the website (i.e., a "clean" website stripped of scripts, images, fonts, etc.) hosted by the third-party service provider (e.g., financial institution).

In some examples, wherein the proxy service may be registered with the third-party service provider by (i) enabling a set of application programming interfaces (APIs) configured to generate the authentication tokens, (ii) querying the third-party service provider for an asymmetric cryptographic key pair, (iii) generating another asymmetric cryptographic key pair for the proxy service, and (iv) utilizing the asymmetric cryptographic key pair and the another asymmetric cryptographic key pair to register the proxy service with the third-party service provider. In some examples, the asymmetric cryptographic key pair for the proxy service may be generated by wrapping a public key in a certificate.

In some examples, the user credentials for accessing the third-party service provider may be identified by (i) querying the access manager to determine whether the user credentials are available and (ii) requesting, utilizing an API, a public key for the third-party service provider in the set of cryptographic keys. In some examples, user credentials may be encrypted by utilizing a public key for the third-party service provider in the set of cryptographic keys to generate a payload. In one example, the payload may include a symmetric key associated with the encrypted public key and an encrypted symmetric key associated with the user credentials.

In some examples, the authentication tokens may be accessed by (i) signing a payload comprising the encrypted user credentials, (ii) sending a package comprising the signed payload to the third-party service provider utilizing an authentication tokens API, (iii) receiving the authentication tokens from the third-party service provider, and (iv) sharing the authentication tokens with the access manager. In some examples, the security action may include (i) requesting the authentication tokens from the access manager and (ii) sending the authentication tokens to the third-party service provider to provide the user access to the website hosted by the third-party service provider without the user credentials, wherein the authentication tokens comprise on-demand limited lifespan authentication tokens. For example, the authentication tokens may be designated as temporary user credentials which may be utilized to complete credentials fields for accessing the website.

In one embodiment, a system for protecting the security of authentication credentials utilized to access sensitive data during online transactions may include at least one physical processor and physical memory that includes computer-executable instructions that, when executed by the physical processor and a set of modules, cause the physical processor to (i) register, by a registration module and utilizing a set of cryptographic keys, a proxy service with a third-party service provider of sensitive online transactions, (ii) identify, by a credentials module, user credentials for accessing the third-party service provider, (iii) encrypt, by an encryption module, the user credentials utilizing the set of cryptographic keys, (iv) send, by a tokens module, the encrypted user credentials in a request for authentication tokens, (v) access, by an access module and responsive to the request, the authentication tokens for sharing with an access manager of the user credentials, and (vi) perform, by a security module, a security action that protects against a data privacy invasion by utilizing the authentication tokens to validate a user requesting access to a website hosted by the third-party service provider without the user credentials.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) register, utilizing a set of cryptographic keys, a proxy service with a third-party service provider of sensitive online transactions, (ii) identify user credentials for accessing the third-party service provider, (iii) encrypt the user credentials utilizing the set of cryptographic keys, (iv) send the encrypted user credentials in a request for authentication tokens, (v) access, responsive to the request, the authentication tokens for sharing with an access manager of the user credentials, and (vi) perform a security action that protects against a data privacy invasion by utilizing the authentication tokens to validate a user requesting access to a website hosted by the third-party service provider without the user credentials.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
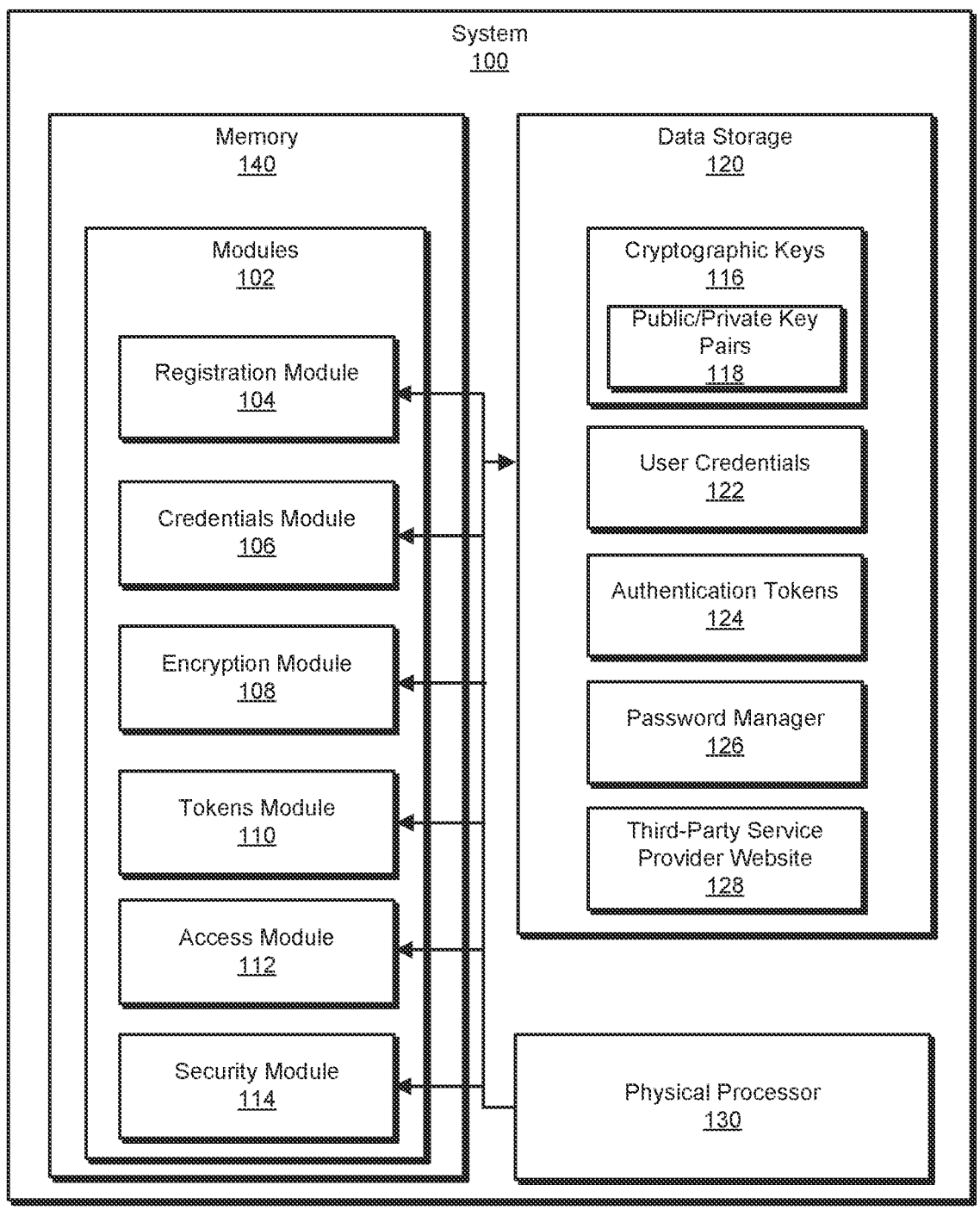
FIG. 1 is a block diagram of an example system for protecting the security of authentication credentials utilized to access sensitive data during online transactions.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting the security of authentication credentials utilized to access sensitive data during online transactions. As will be described in greater detail below, by creating a marketplace for sensitive data service providers, such as financial institutions, for generating on-demand limited lifespan authentication tokens (i.e., "hot" tokens), the systems and methods described herein may establish a trust relationship between a sensitive data provider, customers, and a proxy service (e.g., a web isolation platform). The generated hot tokens may then be utilized in lieu of conventional user authentication credentials (i.e., username/password) to provide a seamless customer login experience onto websites for accessing sensitive data and thereby protect against potential credential theft, due to the interception of credentials in a "hot" path between a customer and the sensitive data provider, by malicious actors in multi-authentication process systems utilized in traditional approaches for accessing sensitive data.

Moreover, the systems and methods described herein may improve the field of computing device security by providing data privacy for client devices utilized for accessing sensitive data through the use of traditional authentication credentials (i.e., username/password). For example, the systems and methods described herein may replace a user's authentication credentials with on-demand limited lifespan authentication tokens when logging on to sensitive data websites.

Figure 2:
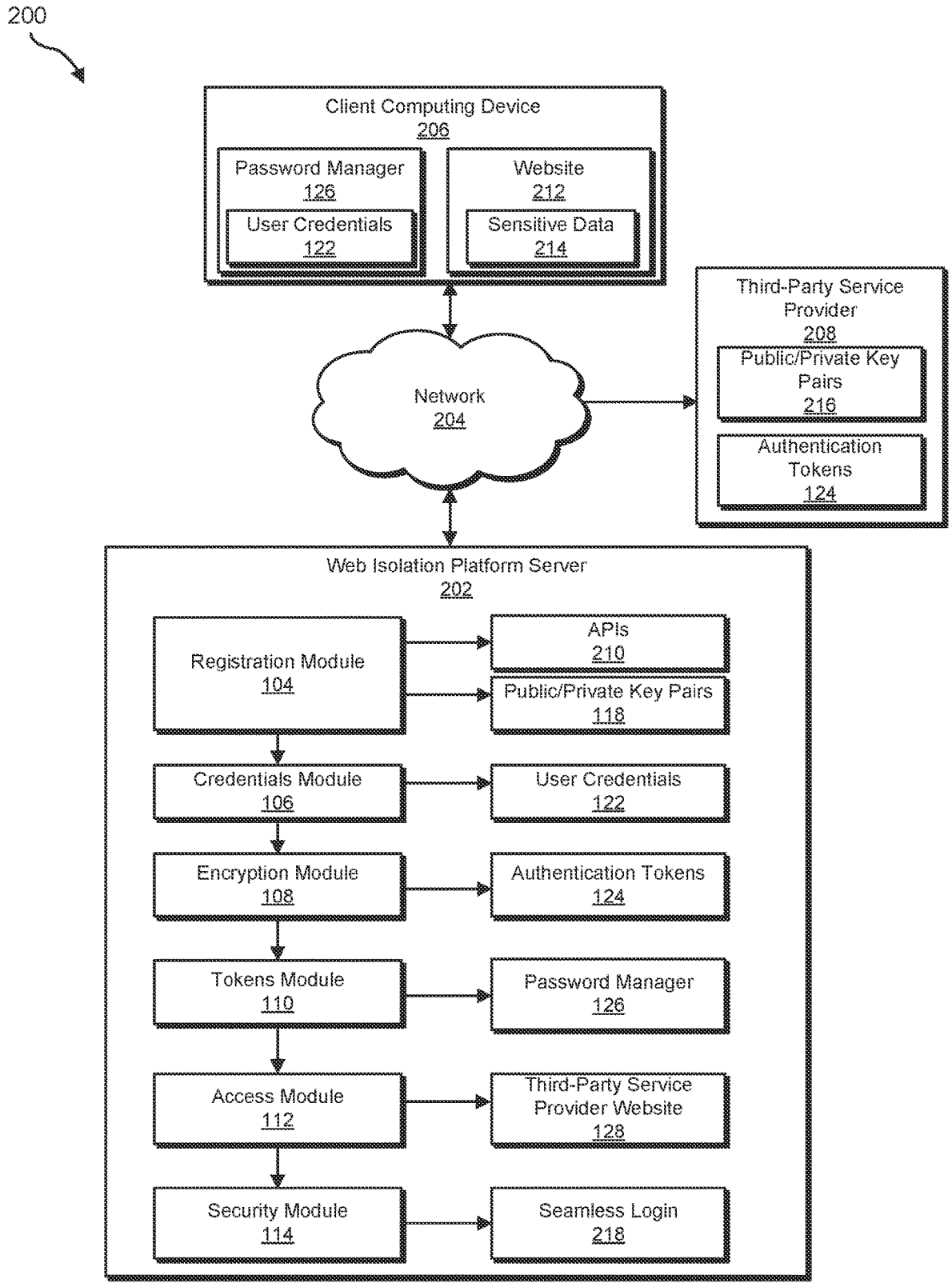
FIG. 2 is a block diagram of an additional example system for protecting the security of authentication credentials utilized to access sensitive data during online transactions.

The following will provide, with reference to FIGS. 1-2, detailed descriptions of example systems for protecting the security of authentication credentials utilized to access sensitive data during online transactions. Detailed descriptions of corresponding computer-implemented methods will also be provided in connection with FIGS. 3-4. Additionally, a detailed description of a communication chart for generating and utilizing authentication tokens to protect the security of authentication credentials for accessing sensitive data during online transactions will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for protecting the security of authentication credentials utilized to access sensitive data during online transactions. As illustrated in this figure, example system 100 may include one or more modules 102 for performing one or more tasks. For example, and as will be explained in greater detail below, example system 100 may include a registration module 104 that registers, utilizing cryptographic keys 116, which may include public/private key pairs 118, a proxy service (e.g., a web isolation platform) with a third-party service provider of sensitive online transactions. Example system 100 may additionally include a credentials module that identifies user credentials 122 for accessing the third-party service provider. Example system 100 may also include an encryption module 108 that encrypts user credentials 122 utilizing cryptographic keys 116. Example system 100 may additionally include a tokens module 110 that sends the encrypted user credentials 122 in a request for authentication tokens 124. Example system 100 may also include an access module 112 that accesses authentication tokens 124 for sharing with an access manager (i.e., password manager 126) of user credentials 122. Example system 100 may additionally include a security module 114 that performs a security action that protects against a data privacy invasion by utilizing authentication tokens 124 to validate a user requesting access to a third-party service provider website 128 without user credentials 122. Although illustrated as separate elements, one or more of modules 102 in FIG. 1 may represent portions of a single module or application.

The term "authentication tokens" (which may also be referred to as "hot tokens") as used herein, may generally refer to on-demand limited lifespan tokens (e.g., OpenID, etc.) for accessing a logon service provided by a third-party service provider. For example, an authentication token may have a short time-to-live (TTL) when utilized within a predetermined amount of time (e.g., within the first few minutes after creation) when being utilized to access a financial services website.

The term "password manager" as used herein, may generally refer to a vault for storing customer credentials (i.e., usernames/passwords). In some examples, a password manager may be utilized to encrypt/decrypt passwords on a client computing device.

The term "proxy service" as used herein, may generally refer to a web isolation platform utilized for rendering a version of a website (i.e., a "clean" website stripped of scripts, images, fonts, etc.) hosted by a third-party service provider. For example, a customer may utilize a web isolation platform service to render a financial institution's website on a remote (i.e., cloud-based) server and view a clean version of the website on a client computing device (e.g., a desktop or mobile computing device) where none of the scripts, images, fonts, etc. from the original website are rendered or executed. By utilizing a web isolation platform service, customers may only receive a website view with all subsequent actions being relayed back to the server for execution.

The term "third-party service provider" as used herein, may generally refer to any provider of services requiring authentication for providing sensitive data (e.g., financial transaction information, etc.) to customers. For example, an online banking institution may utilize an authentication process for providing customer access to account information and enabling the customer to execute account transactions.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., web isolation platform server 202, client computing device 206 and/or third-party service provider 208). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting the security of authentication credentials utilized to access sensitive data during online transactions. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store cryptographic keys 116 (including public/private key pairs 118), user credentials 122, authentication tokens 124, password manager 126, and third-party service provider website 128.

Example system 100 in FIG. 1 may be implemented in a variety of ways. For example, all or a portion of example system 100 may represent portions of example system 200 in FIG. 2. As shown in FIG. 2, system 200 may include web isolation platform server 202 in communication with client computing device 206 and third-party service provider 208 via a network 204. In one example, all or a portion of the functionality of modules 102 may be performed by web isolation platform server 202, client computing device 206, third-party service provider 208, and/or any other suitable computing system. As will be described in greater detail below, one or more of modules 102 from FIG. 1 may, when executed by at least one processor of web isolation platform server 202, client computing device 206 and/or third-party service provider 208 to protect the security of authentication credentials utilized to access sensitive data during online transactions.

For example, registration module 104 may register, utilizing public/private key pairs 118 and public/private key pairs 216, a proxy service (e.g., web isolation platform server 202) with third-party service provider 208. Next, credentials module 106 may identify user credentials 122 for accessing third-party service provider 208. Then, encryption module 108 may encrypt user credentials 122 utilizing public/private key pairs 118 and/or public/private key pairs 216. Next, tokens module 110 may send encrypted user credentials 122 in a request for authentication tokens 124. Then, access module 112 may access authentication tokens 124 for sharing with password manager 126. Finally, security module 114 may perform a seamless login 218 that protects against a data privacy invasion by utilizing authentication tokens 124 to validate a user requesting access to a website 212 hosted without user credentials 122, to access sensitive data 214.

Web isolation platform server 202 generally represents any type or form of computing device capable of reading and/or executing computer-executable instructions. For example, web isolation platform server 202 may be a cloud server for rendering a version of a website (i.e., a "clean" website stripped of scripts, images, fonts, etc.) hosted by third-party service provider 208. Additional examples of web isolation platform server 202 include, without limitation, security servers, application servers, web servers, storage servers, and/or database servers configured to run certain software applications and/or provide various security, web, storage, and/or database services. Although illustrated as a single entity in FIG. 2, web isolation platform server 202 may include and/or represent a plurality of servers that work and/or operate in conjunction with one another.

Client computing device 206 may generally represent any type or form of computing device capable of reading computer-executable instructions. In some examples, client computing device 206 may be a desktop or mobile computing device running a web browser extension utilized for accessing and making secure sensitive data transactions on websites hosted by third-party service provider 208. Additional examples of client computing device 206 include, without limitation, servers, cellular phones, Personal Digital Assistants (PDAs), multimedia players, embedded systems, smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between web isolation platform server 202, client computing device 206 and third-party service provider 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
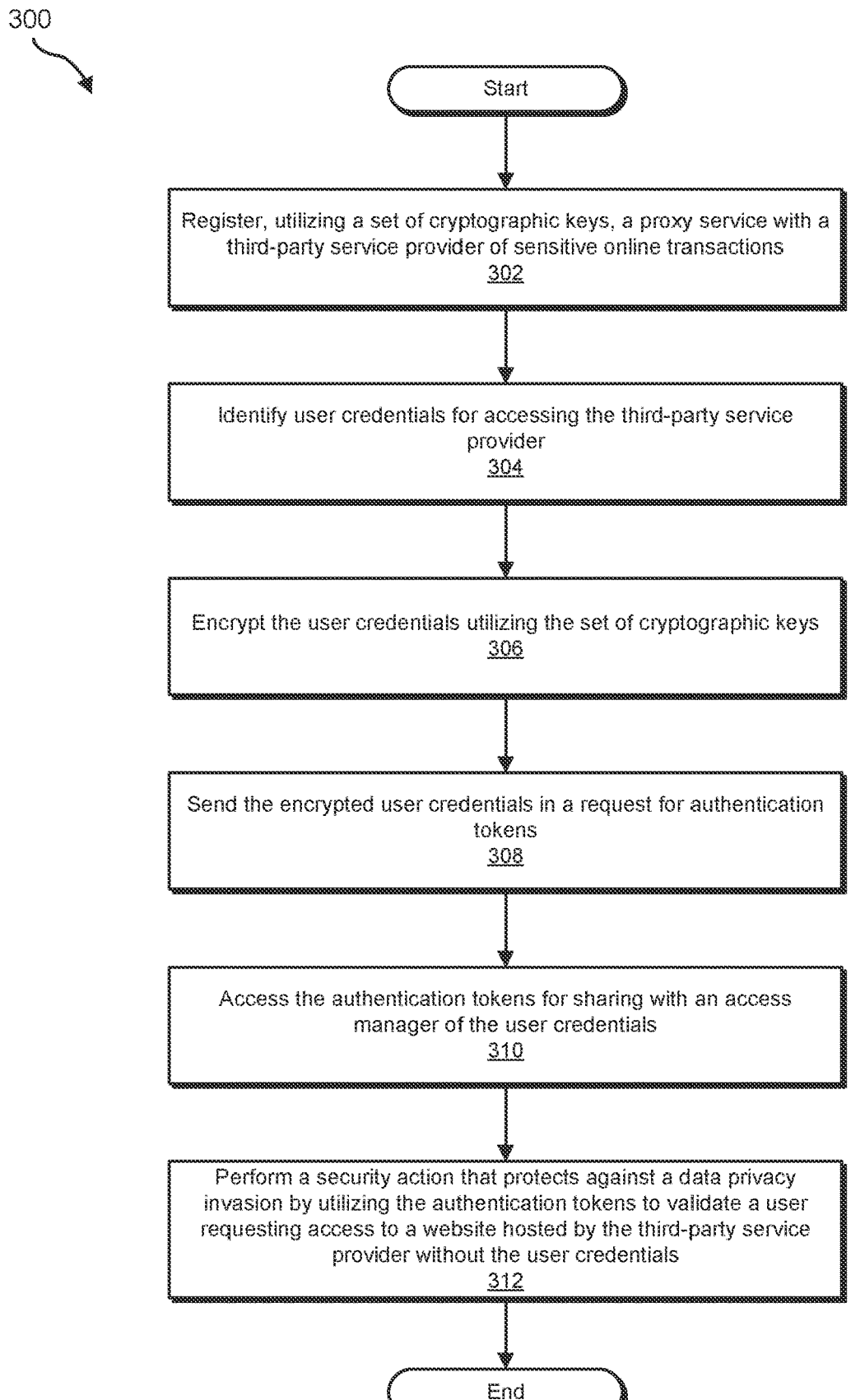
FIG. 3 is a flow diagram of an example method for protecting the security of authentication credentials utilized to access sensitive data during online transactions.
Figure 4:
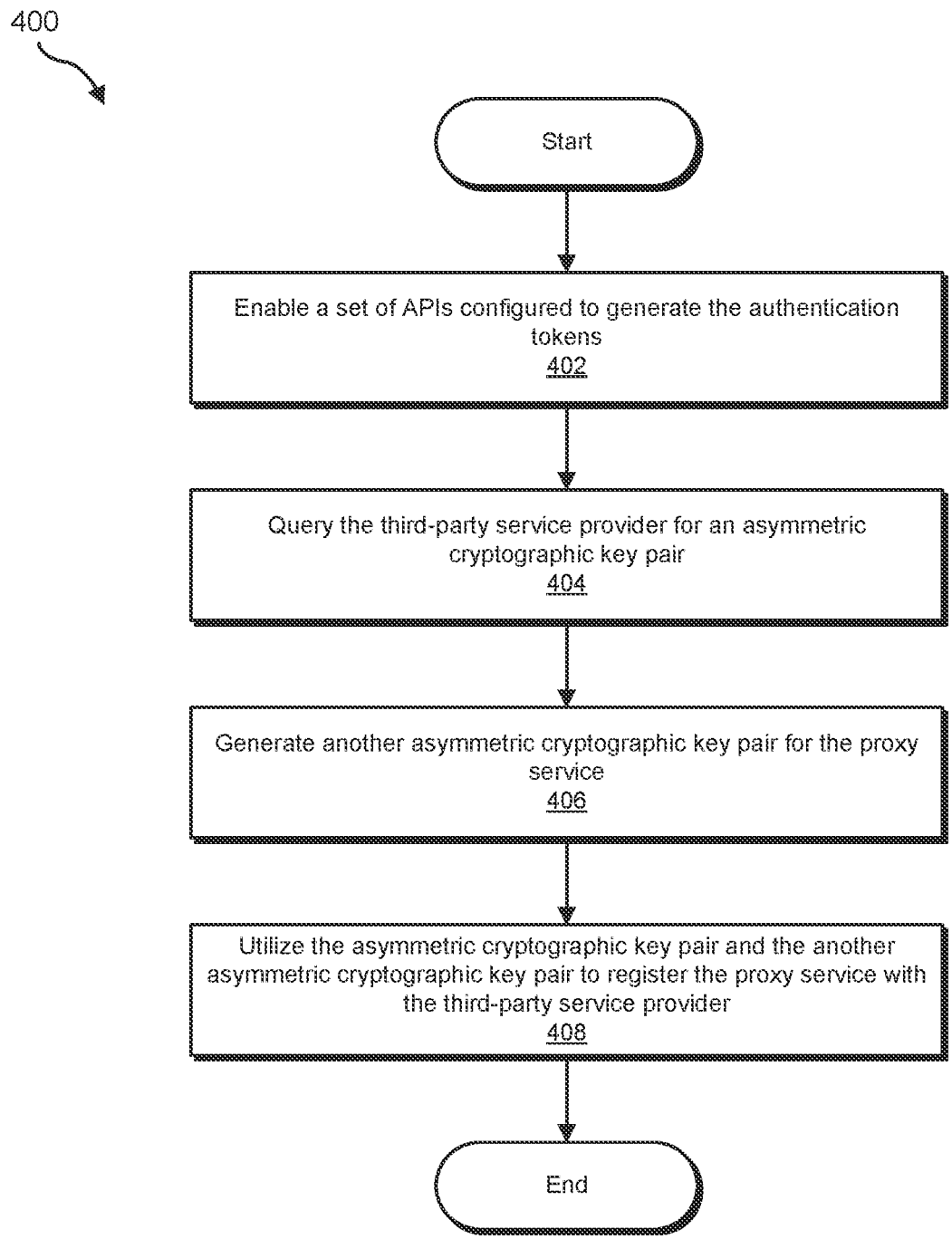
FIG. 4 is a flow diagram of an additional example method for protecting the security of authentication credentials utilized to access sensitive data during online transactions.

FIGS. 3-4 are flow diagrams of example computer-implemented methods 300 and 400 for protecting the security of authentication credentials utilized to access sensitive data during online transactions. The steps shown in FIGS. 3-4 may be performed by any suitable computer-executable code and/or computing system, including system 100 in FIG. 1, system 200 in FIG. 2, and/or variations or combinations of one or more of the same. In one example, each of the steps shown in FIGS. 3-4 may represent an algorithm whose structure includes and/or is represented by multiple sub-steps, examples of which will be provided in greater detail below.

As illustrated in FIG. 3, at step 302 one or more of the systems described herein may register, utilizing a set of cryptographic keys, a proxy service with a third-party service provider of sensitive online transactions. For example, registration module 104 may, as part of web isolation platform server 202 in FIG. 2, utilize public/private key pairs 118 and public/private key pairs 216 to register web isolation platform server 202 with third-party service provider 208.

Registration module 104 may register web isolation platform server 202 with third-party service provider 208 in a variety of ways which will now be described with respect to FIG. 4. Turning now to FIG. 4, at step 402, one or more of the systems described herein may enable a set of APIs configured to generate authentication tokens. For example, registration module 104 may, as part of web isolation platform server 202 in FIG. 2, enable APIs 210 that may be configured to generate authentication tokens 124 for third-party service provider 208.

At step 404, one or more of the systems described herein may query the third-party service provider for an asymmetric cryptographic key pair. For example, registration module 104 may, as part of web isolation platform server 202 in FIG. 2, query third-party service provider 208 for a public/private key pair 216.

At step 406, one or more of the systems described herein may generate another asymmetric cryptographic key pair for the proxy service. For example, registration module 104 may, as part of web isolation platform server 202 in FIG. 2, generate a public/private key pair 118 for web isolation platform server 202.

Registration module 104 may generate a public/private key pair 118 in a variety of ways. For example, registration module 104 may wrap a public key from public/private key pair 118 in a certificate.

At step 408, one or more of the systems described herein may utilize the asymmetric cryptographic key pair and the another asymmetric cryptographic key pair to register the proxy service with the third-party service provider. For example, registration module 104 may, as part of web isolation platform server 202 in FIG. 2, utilize a public/private key pair 216 and a public/private key pair 118 to register web isolation platform server 202 with third-party service provider 208.

Returning now to FIG. 3, at step 304, one or more of the systems described herein may identify user credentials for accessing the third-party service provider. For example, credentials module 106 may, as part of web isolation platform server 202 in FIG. 2, identify user credentials 122 for accessing third-party service provider 208.

Credentials module 106 may identify user credentials 122 in a variety of ways. In some examples, credentials module 106 may query password manager 126 to determine whether user credentials 122 are available. Then, upon determining that user credentials 122 are available, credentials module 106 may request, utilizing an API 210, a public key for third-party service provider 208 in public/private key pairs 216.

At step 306, one or more of the systems described herein may encrypt the user credentials utilizing the set of cryptographic keys. For example, encryption module 108 may, as part of web isolation platform server 202 in FIG. 2, encrypt user credentials 122 a utilizing public/private key pair 216.

Encryption module 108 may encrypt user credentials 122 in a variety of ways. In some examples, encryption module 108 may encrypt user credentials 122 by utilizing a public key in a public/private key pair 216 to generate a payload. In one example, payload may include a symmetric key associated with the encrypted public key and an encrypted symmetric key associated with user credentials 122 (e.g., [Epubkey/TB(SK)=ESK(Creds)], where TB is the third-party service provider 208 and SK is a symmetric key).

At step 308, one or more of the systems described herein may send the encrypted user credentials in a request for authentication tokens. For example, tokens module 110 may, as part of web isolation platform server 202 in FIG. 2, send encrypted user credentials 122 in a request for authentication tokens 124 from password manager 126 to an API 210. In some examples, the request may be sent with additional metadata such as cookies, a website address for third-party service provider website 128, etc.

At step 310, one or more of the systems described herein may access the authentication tokens for sharing with an access manager of the user credentials. For example, access module 112 may, as part of web isolation platform server 202 in FIG. 2, access authentication tokens 124 for sharing with password manager 126.

Access module 112 may access authentication tokens 124 in a variety of ways. In some examples, access module 112 may sign a payload including encrypted user credentials 122. In some examples, the payload may include signed encrypted user credentials 122 along with a private key in a public/private key pair 118. Then, access module 112 may send a package, including the signed payload, in a request to third-party service provider 208 utilizing an API 210 (e.g., [Sig(E(creds))+E(creds)]). In some examples, third-party service provider 208 may validate the request based on the signature of the payload and may then decrypt the encrypted credential and any additional metadata included in the package prior to issuing authentication tokens 124. Next, access module 112 may receive authentication tokens 124 from third-party service provider 208. Finally, access module 112 may share authentication tokens 124 with password manager 126.

At step 312, one or more of the systems described herein may perform a security action that protects against a data privacy invasion by utilizing the authentication tokens to validate a user requesting access to a website hosted by the third-party service provider without the user credentials. For example, security module 114 may, as part of web isolation platform server 202 in FIG. 2, utilize authentication tokens 124 to perform a seamless login 218 on third-party service provider website 128 (i.e., automatically login without a user without requesting user credentials 122).

Security module 114 may perform seamless login 218 in a variety of ways. In some examples, security module 114 may request authentication tokens 124 from password manager 126. Then, security module 114 may send authentication tokens 124 to third-party service provider 208 to provide user access to third-party service provider website 128 without user credentials 122. In some examples, security module 114 may designate authentication tokens 124 as temporary user credentials and utilize the temporary user credentials to complete logon fields (e.g., username/password fields) for accessing third-party service provider website 128.

Figure 5:
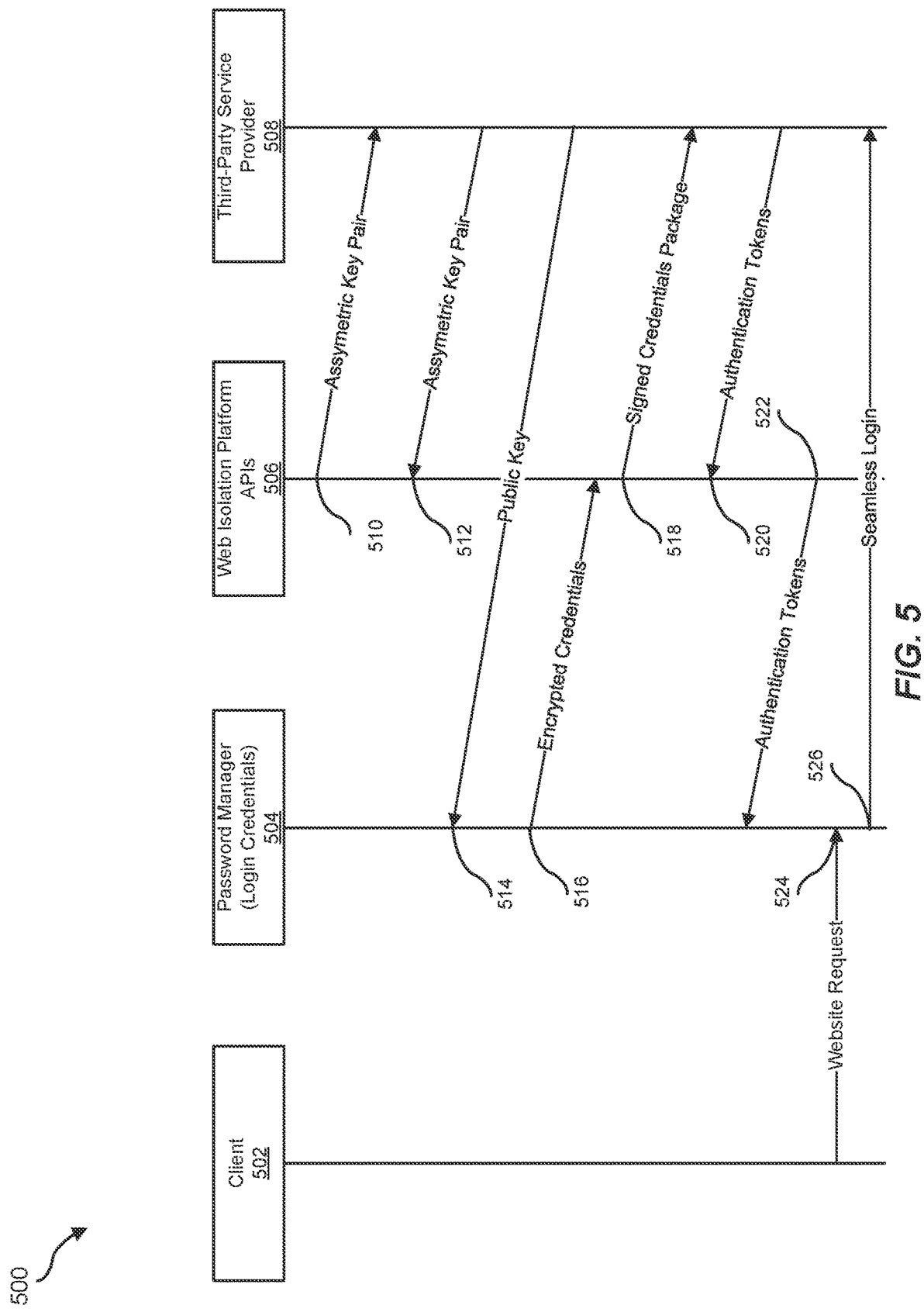
FIG. 5 is a communication chart for generating and utilizing authentication tokens to protect the security of authentication credentials for accessing sensitive data during online transactions.

Turning now to FIG. 5, a communication chart 500 for generating and utilizing authentication tokens to protect the security of authentication credentials for accessing sensitive data during online transactions, is shown. Communication chart 500 shows client 502 in communication with a password manager 504 (utilized for storing login credentials), web isolation platform APIs 506, and third-party service provider 508. At 510 and 512, web isolation platform APIs 506 may exchange asymmetric key pairs (i.e., a public/private key pair) with third-party service provider 508.

At 514, password manager 504 may receive a public key from third-party service provider 508. At 516, password manager 504 may utilize the public key to encrypt the login credentials and then send the encrypted credentials to web isolation platform APIs 506. At 518, web isolation platform APIs 506 may sign the encrypted credentials and then send the signed encrypted credentials in a package to third-party service provider 508.

At 520, web isolation platform APIs 506 may receive authentication tokens from third-party service provider 508 (after third-party service provider 508 has validated and decrypted the package containing the signed encrypted credentials) and then, at 522, send the authentication tokens to password manager 504. At 524 password manager 504 may receive a third-party service provider website request (i.e., a website login request) from client 502 and then utilize the authentication tokens to perform a seamless login onto the website.

As explained above in connection with example method 300 in FIG. 3, the systems and methods herein may utilize a multi-vendor protocol agnostic authentication model that provides a no-login authentication mechanism utilizing a security platform's services for increased security/privacy. By creating a marketplace for sensitive data service providers, such as financial institutions, for generating on-demand limited lifespan authentication tokens (i.e., "hot" tokens), the systems and methods described herein may establish a trust relationship between a sensitive data provider, customers, and a proxy service (e.g., a web isolation platform). The generated hot tokens may then be utilized in lieu of conventional user authentication credentials (i.e., username/password) to provide a seamless customer login experience onto websites for accessing sensitive data and thereby protect against potential credential theft, due to the interception of credentials in a "hot" path between a customer and the sensitive data provider, by malicious actors in multi-authentication process systems utilized in traditional approaches for accessing sensitive data.

Figure 6:
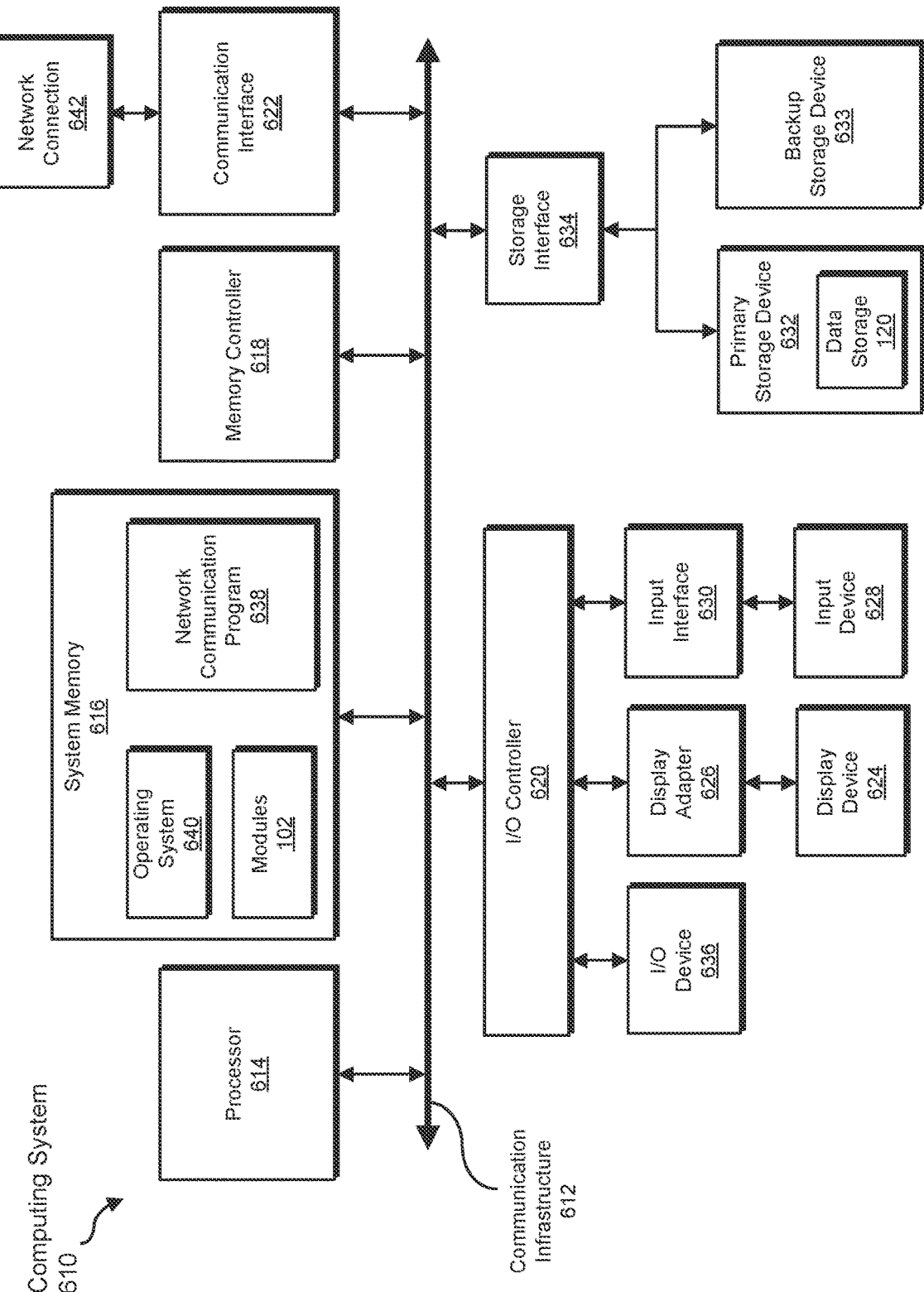
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like.

Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
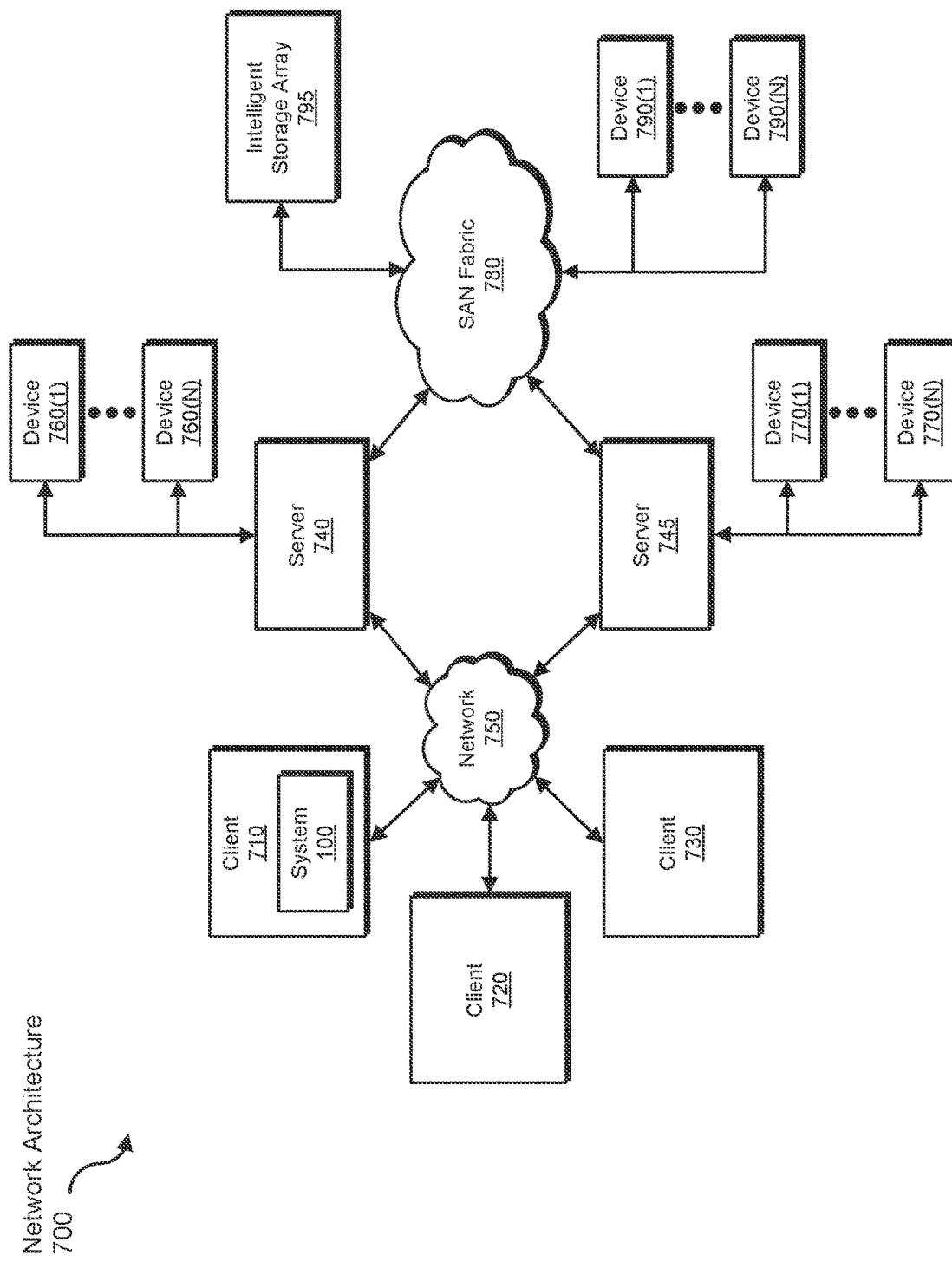
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for protecting the security of authentication credentials utilized to access sensitive data during online transactions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting the security of authentication credentials utilized to access sensitive data during online transactions, at least a portion of the method being performed by one or more computing devices comprising at least one processor, the method comprising:
   registering, by the one or more computing devices and utilizing a set of cryptographic keys, a proxy service with a third-party service provider of sensitive online transactions;
   identifying, by the one or more computing devices, user credentials for accessing the third-party service provider;
   encrypting, by the one or more computing devices, the user credentials utilizing the set of cryptographic keys;
   sending, by the one or more computing devices, the encrypted user credentials in a request for authentication tokens;
   accessing, by the one or more computing devices and responsive to the request, the authentication tokens for sharing with an access manager of the user credentials; and
   performing, by the one or more computing devices, a security action that protects against a data privacy invasion by utilizing the authentication tokens to validate a user requesting access to a website hosted by the third-party service provider without the user credentials.

2. The computer-implemented method of claim 1, wherein registering the proxy service with the third-party service provider comprises:
   enabling a set of application programming interfaces (APIs) configured to generate the authentication tokens;
   querying the third-party service provider for an asymmetric cryptographic key pair;
   generating another asymmetric cryptographic key pair for the proxy service; and
   utilizing the asymmetric cryptographic key pair and the another asymmetric cryptographic key pair to register the proxy service with the third-party service provider.

3. The computer-implemented method of claim 2, wherein generating the another asymmetric cryptographic key pair for the proxy service comprises wrapping a public key in a certificate.

4. The computer-implemented method of claim 1, wherein identifying the user credentials for accessing the third-party service provider comprises:
   querying the access manager to determine whether the user credentials are available; and
   requesting, utilizing an API, a public key for the third-party service provider in the set of cryptographic keys.

5. The computer-implemented method of claim 1, wherein encrypting, utilizing the set of cryptographic keys, the user credentials comprises utilizing a public key for the third-party service provider in the set of cryptographic keys to generate a payload.

6. The computer-implemented method of claim 5, wherein the payload comprises a symmetric key associated with an encrypted public key and an encrypted symmetric key associated with the user credentials.

7. The computer-implemented method of claim 1, wherein accessing, responsive to the request, the authentication tokens for sharing with an access manager of the user credentials comprises:
   signing a payload comprising the encrypted user credentials;
   sending a package comprising the signed payload to the third-party service provider utilizing an authentication tokens API;
   receiving the authentication tokens from the third-party service provider; and
   sharing the authentication tokens with the access manager.

8. The computer-implemented method of claim 1, wherein performing the security action that protects against a data privacy invasion comprises:
   requesting the authentication tokens from the access manager; and
   sending the authentication tokens to the third-party service provider to provide the user access to the website hosted by the third-party service provider without the user credentials, wherein the authentication tokens comprise on-demand limited lifespan authentication tokens.

9. The computer-implemented method of claim 8, wherein sending the authentication tokens to the third-party service provider comprises:

designating the authentication tokens as temporary user credentials; and utilizing the temporary user credentials to complete credentials fields for accessing the website.

10. The computer-implemented method of claim 1, wherein the proxy service comprises an isolation platform for generating a version of the website hosted by the third-party service provider.

11. A system for protecting the security of authentication credentials utilized to access sensitive data during online transactions, the system comprising:

at least one physical processor;

physical memory comprising computer-executable instructions and one or more modules that, when executed by the physical processor, cause the physical processor to:

register, by a registration module and utilizing a set of cryptographic keys, a proxy service with a third-party service provider of sensitive online transactions;

identify, by a credentials module, user credentials for accessing the third-party service provider;

encrypt, by an encryption module, the user credentials utilizing the set of cryptographic keys;

send, by a tokens module, the encrypted user credentials in a request for authentication tokens;

access, by an access module and responsive to the request, the authentication tokens for sharing with an access manager of the user credentials; and perform, by a security module, a security action that protects against a data privacy invasion by utilizing the authentication tokens to validate a user requesting access to a website hosted by the third-party service provider without the user credentials.

12. The system of claim 11, wherein the registration module registers the proxy service with the third-party service provider by:

enabling a set of application programming interfaces (APIs) configured to generate the authentication tokens;

querying the third-party service provider for an asymmetric cryptographic key pair;

generating another asymmetric cryptographic key pair for the proxy service; and utilizing the asymmetric cryptographic key pair and the another asymmetric cryptographic key pair to register the proxy service with the third-party service provider.

13. The system of claim 12, wherein the registration module generates the another asymmetric cryptographic key pair for the proxy service by wrapping a public key in a certificate.

14. The system of claim 11, wherein the credentials module identifies the user credentials for accessing the third-party service provider by:

querying the access manager to determine whether the user credentials are available; and requesting, utilizing an API, a public key for the third-party service provider in the set of cryptographic keys.

15. The system of claim 11, wherein the encryption module utilizes the set of cryptographic keys to encrypt the user credentials by utilizing a public key for the third-party service provider in the set of cryptographic keys to generate a payload.

16. The system of claim 15, wherein the payload comprises a symmetric key associated with an encrypted public key and an encrypted symmetric key associated with the user credentials.

17. The system of claim 11, wherein the access module accesses, responsive to the request, the authentication tokens for sharing with an access manager of the user credentials by:

signing a payload comprising the encrypted user credentials;

sending a package comprising the signed payload to the third-party service provider utilizing an authentication tokens API;

receiving the authentication tokens from the third-party service provider; and sharing the authentication tokens with the access manager.

18. The system of claim 11, wherein the security module performs the security action that protects against a data privacy invasion by:

requesting the authentication tokens from the access manager; and sending the authentication tokens to the third-party service provider to provide the user access to the website hosted by the third-party service provider without the user credentials, wherein the authentication tokens comprise on-demand limited lifespan authentication tokens.

19. The system of claim 11, wherein the security module sends the authentication tokens to the third-party service provider by:

designating the authentication tokens as temporary user credentials; and utilizing the temporary user credentials to complete credentials fields for accessing the website.

20. A non-transitory computer-readable medium comprising one or more computer-executable instructions that, when executed by at least one processor of a computing device, cause the computing device to:

register, utilizing a set of cryptographic keys, a proxy service with a third-party service provider of sensitive online transactions;

identify user credentials for accessing the third-party service provider;

encrypt the user credentials utilizing the set of cryptographic keys;

send the encrypted user credentials in a request for authentication tokens;

access, responsive to the request, the authentication tokens for sharing with an access manager of the user credentials; and perform a security action that protects against a data privacy invasion by utilizing the authentication tokens to validate a user requesting access to a website hosted by the third-party service provider without the user credentials.

* * * * *